Feb. 16, 1926. 1,572,888
E. DÄNHARDT
APPARATUS FOR SEPARATING SOLID SUBSTANCES FROM GASES AND VAPORS, MORE
ESPECIALLY BLAST FURNACE GASES
Filed August 15, 1921
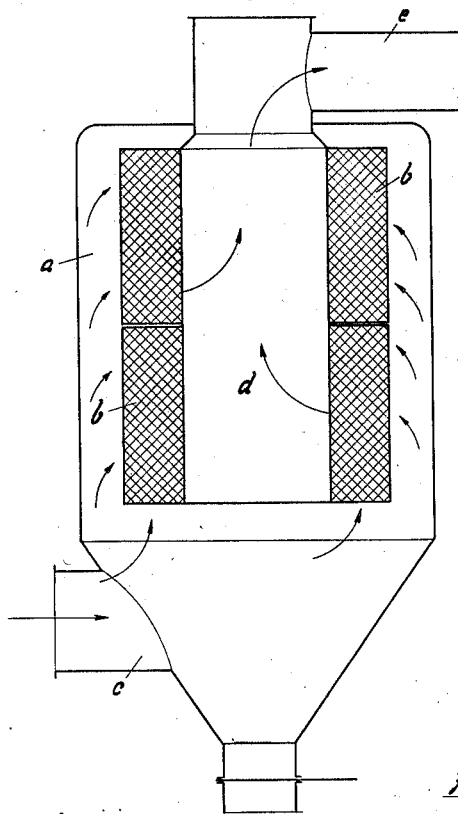
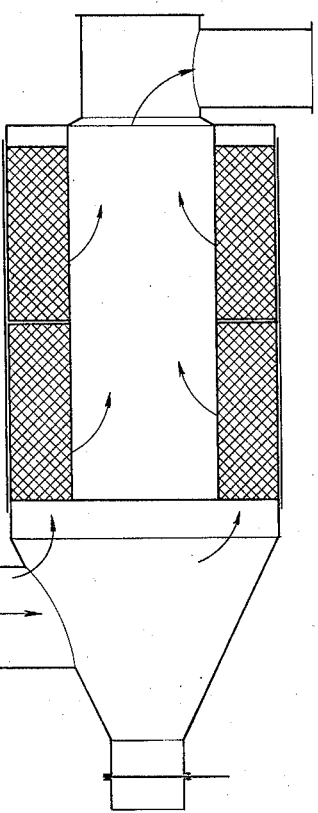
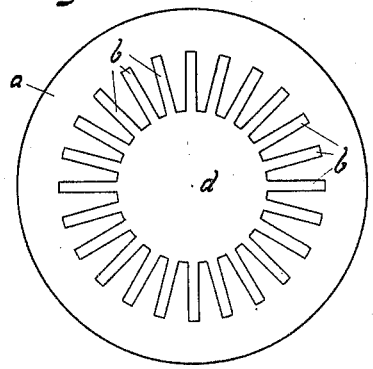
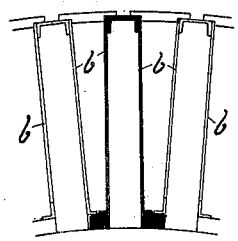
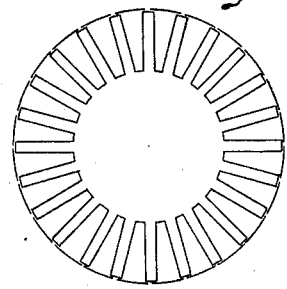
Inventor
Emil Dänhardt:
by
W. E. Evans
Attorney.

Patented Feb. 16, 1926.

1,572,888

UNITED STATES PATENT OFFICE.

EMIL DÄNHARDT, OF COLOGNE-KALK, GERMANY.

APPARATUS FOR SEPARATING SOLID SUBSTANCES FROM GASES AND VAPORS, MORE ESPECIALLY BLAST-FURNACE GASES.

Application filed August 15, 1921. Serial No. 492,494.

*To all whom it may concern:*

Be it known that I, EMIL DÄNHARDT, a citizen of the German State, residing at 27 Kaiserstrasse, Cologne-Kalk, Germany, have invented a certain new and useful Apparatus for Separating Solid Substances from Gases and Vapors, More Especially Blast-Furnace Gases, of which the following is a specification.

This invention relates to apparatus for separating solid substances from gases and vapors, more especially blast furnace gases.

According to the invention single filter pockets or groups of the pockets are provided, which are withdrawable from the containing casing, being arranged in rows in such manner that they form the outlet which carries the purified gas where it is to be used. The construction may advantageously be such that the outer wall faces of the pockets form a part of the casing and the cavity between the separate outer faces of the pockets is suitably covered or closed.

By reason of the relatively small quantity of material required and the simplicity of construction, the apparatus is inexpensive. Furthermore, repairs can be executed in a short time and consequently the cost of upkeep is small.

The accompanying drawings illustrate by way of example two constructions according to the invention.

Figure 1 represents a vertical section of a filter.

Figure 2 is a cross-section corresponding to Figure 1 in a plane across the filter pockets.

Figure 3 is a detail cross-sectional view illustrating the method of fastening the separate filter surfaces.

Figure 4 illustrates a vertical section of a modified form of filter.

Figure 5 is a cross section corresponding to Figure 4 in a plane across the filter pockets.

In these figures *a* is the filter casing in which the stationary filter pockets are disposed radially and in such manner that the space *d* enclosed by them forms a part of the outlet for the purified gas. The separate filter surfaces of the pockets *b* are advantageously fixed to angle irons or V-shaped bars (Figure 3) in such manner that the pockets can be easily replaced singly or in groups. The impure gas passes through the transversely disposed inlet pipe *c* into the filter casing at the lower conical part thereof beneath the filter pockets, thence upwardly and thence inwardly through the filter surfaces, and thus into the central space *d*, whence purified it is carried out through the outlet pipe *e*. The path of the gases through the filter is thus as illustrated by the arrows in Figures 1 and 4. It is not essential for a cavity to be provided between the filter surfaces and the casing *a*, on the contrary, the construction may be as shown in Figures 4 and 5. In this construction the outer space between the pockets is closed in, so that the closure plates form the casing *a*. This construction is particularly suitable when it is desired to have the purifying apparatus as compact as possible.

The dust which clings to the filter surfaces may be removed in many different ways, for example, by tapping the surfaces with a corresponding tapping device, or by purified gas being blown out from the central space outwardly at certain intervals.

I claim:

1. Apparatus for the separation of solid substances from gases and vapors, more especially from blast furnace gases, comprising a casing having a conical lower part, a stationary series of removable filter pockets disposed radially within the casing to form a central outlet within the casing for the purified gas, the said filter pockets being disposed above the said conical lower part of the said casing, means detachably to mount said filter pockets individually and collectively in position within the casing, an outlet pipe at the upper end of the said central outlet, and an inlet to the casing for dust laden gas, said inlet being transversely disposed and connected to the conical lower part of the said casing, the filter pockets being so disposed in said casing above the inlet that the cavities between the outer faces of the filter pockets are all directly accessible to the upwardly flowing dust laden gas.

2. Apparatus for the separation of solid substances from gases and vapors, more especially from blast furnace gases, comprising a casing, a series of filter pockets disposed radially within the said casing, the outer wall faces of the pockets forming part of the casing and the cavities between the outer wall faces of the pockets being covered or closed for the completion of the casing, the said filter pockets forming a central outlet within the casing for the purified gas, an outlet pipe at the upper end of the said outlet, and an inlet to the casing for dust laden gas, the said inlet being disposed beneath the said casing and the filter pockets therein.

EMIL DÄNHARDT.